United States Patent
James, Jr.

(10) Patent No.: US 6,575,393 B1
(45) Date of Patent: *Jun. 10, 2003

(54) APPARATUS FOR APPLYING AND RETRIEVING PROTECTIVE GROUND COVERINGS

(76) Inventor: Forrest Hood James, Jr., 2191Ivy Creek Church Rd., Rutledge, AL (US) 36071

( * ) Notice: Subject to any disclaimer, the term of this patent is extended or adjusted under 35 U.S.C. 154(b) by 0 days.

This patent is subject to a terminal disclaimer.

(21) Appl. No.: 09/972,771

(22) Filed: Oct. 8, 2001

Related U.S. Application Data (63) Continuation-in-part of application No. 09/397,574, filed on Sep. 16, 1999, now Pat. No. 6,299,094.

(51) Int. Cl.[7] .......................... B65H 75/48; B65H 75/34
(52) U.S. Cl. ................... 242/390; 242/391; 242/391.3; 242/397; 242/399.1; 242/919
(58) Field of Search ................................ 242/390, 391, 242/391.1, 391.2, 391.3, 397, 390.2, 390.4, 403, 399.1, 919

(56) References Cited

U.S. PATENT DOCUMENTS

| | | |
|---|---|---|
| 987,593 A | 3/1911 | O'Maley |
| 1,550,082 A | 8/1925 | Lintz et al. |
| 2,616,636 A | 11/1952 | Aden |
| 3,403,870 A | 10/1968 | Garaboux |
| 3,473,755 A | 10/1969 | Brown |
| 3,481,556 A | 12/1969 | McDonnell |
| 3,913,854 A | 10/1975 | McClure |
| 4,024,970 A | 5/1977 | Schirer |
| 4,044,963 A | 8/1977 | Hostetler |
| 4,049,140 A | 9/1977 | Roose |
| 4,084,763 A | 4/1978 | Zamboni |
| 4,253,619 A | 3/1981 | Corderoy et al. |
| 4,280,777 A | 7/1981 | Gray |
| 4,339,096 A | 7/1982 | May |
| 4,494,707 A | 1/1985 | Niibori et al. |
| 4,513,530 A | 4/1985 | Nyboer |
| 4,555,073 A | 11/1985 | Barazone |
| 4,632,329 A | 12/1986 | Burley |
| 4,742,970 A | 5/1988 | Barazone |
| 4,754,815 A | 7/1988 | Brouwer et al. |
| 5,215,278 A | 6/1993 | Hess |
| 5,304,014 A | 4/1994 | Slutz |
| 5,524,302 A | 6/1996 | Ragsdale et al. |
| 5,536,116 A | 7/1996 | Lammers et al. |
| 5,620,281 A | 4/1997 | Lammers et al. |
| 5,709,351 A | 1/1998 | Osborn et al. |
| 5,897,073 A | 4/1999 | McVaugh |
| 6,299,094 B1 * | 10/2001 | James, Jr. .................. 242/390 |

FOREIGN PATENT DOCUMENTS

| | | |
|---|---|---|
| DE | 3838628 | 5/1990 |
| GB | 2129462 | 10/1984 |

* cited by examiner

Primary Examiner—William A. Rivera
(74) Attorney, Agent, or Firm—Lanier Ford Shaver & Payne P.C.

(57) ABSTRACT

A cover reel assembly for laying down or retrieving a ground cover on the ground comprising a first frame attachable to a prime mover, the first frame having support arms to hold a cover reel rotatably, with a hydraulic pump between the prime mover and the first frame, between the first frame and support arms, or between the first frame and a second frame raise and lower the cover reel. The prime mover pushes the cover reel assembly forward to unwind a ground cover from the cover reel onto the ground, simultaneously laying cables or chains on top of the ground cover to hold the ground cover on the ground. The ground cover and cables or chains are rewound by a reverse procedure pushing the cover reel assembly forward. An alternate embodiment operates by pulling the cover reel assembly.

46 Claims, 9 Drawing Sheets

APPARATUS FOR APPLYING AND RETRIEVING PROTECTIVE GROUND COVERINGS

This is a continuation-in-part of U.S. patent application Ser. No. 09/397,574 filed Sep. 16, 1999 now U.S. Pat. No. 6,299,094.

BACKGROUND OF THE INVENTION

1. Field of the Invention

This invention relates generally to machines for laying down and taking up ground covers using reels and particularly to a machine that rapidly lays down a ground cover on a road, secures the cover to the road, and takes up the cover for reuse.

2. Technical Background

Numerous machines have been described which use reel mechanisms to lay down covers on the ground and take them up. Some of these have been for covering baseball fields, football fields, new-laid concrete, winter recreation surfaces, and land fills. Some machines have been described for laying down or taking up plastic piping or grass turf. In those machines, the cover reels cannot raise or lower the cover reel, do not operate with the cover reel on the ground, or do not have a means of pressing the cover reel on the ground. In addition, they may have no means to secure the cover on the ground. Some of these machines may have a high degree of mechanical complexity or require a built-in prime mover.

There exists a need for a practical cover reel assembly that can rapidly apply and fasten a cover to the surface of a road under construction to protect it from rain and other weather conditions, and rapidly retrieve the cover for reuse, or storage. The cover needs to be aligned accurately on the road by uniformly pressing the cover onto the road as the cover is unwound from a reel. The present invention provides a novel, practical means for meeting these needs, particularly to allow construction work to commence immediately after the rain stops rather than having to wait a period of time for an uncovered road bed to dry out.

SUMMARY OF INVENTION

The present invention is an apparatus for laying down or retrieving a ground cover. The apparatus is useful for rapidly laying a cover over a road or highway to protect the road or highway from rain and precipitation and other weather exposure to reduce the amount of work necessary to repair a road bed from erosion caused by rain. It is also useful for protecting road construction sites, road preparation sites, and excavation sites, and road beds from rain and other weather conditions prior to laying asphalt or concrete. The cover can then be rapidly retrieved by the apparatus when there is no longer a need to cover the road or highway. In one embodiment, the invention has a first frame which can be attached to a prime mover such as a forklift or tractor. The first frame has pivotal support arms which are attached to a second frame and a cover reel. Hydraulic means are also connected between the first frame and pivot support arms to raise and lower the cover reel and second frame. Alternatively, the hydraulic means are positioned between the prime mover and first frame and the cover reel is lowered to the ground by simply rotating the first frame forward. Cable reels with cables or chains, having a motor/transmission assembly, are located on the first frame. The frame holding the cover reel may have arms to provide a tension bar or rollers in front of and in back of the cover reel. The tension bar or roller in front of the cover reel may include a brush mechanism to clean the underside of the cover.

The cover on the reel can be lowered to the ground and laid onto the road by the action of the prime mover pushing the cover reel forward, freely unwinding the cover over the tension or roller bar. The cables or chains will unwind freely from behind the cover reel and serve to hold the cover in a fixed position on the ground by laying on the cover 6" to 18" from each edge of the cover to prevent wind from blowing the cover off the ground. A downward pressing force can be applied to the cover reel by the action of the hydraulic means to facilitate unwinding and alignment of the cover on the ground. The ground cover can be rewound and taken up onto the cover reel by a reverse process. The cover is passed over the tension bar and attached to the cover reel. The cover reel is then pushed forward by the prime mover, winding up the cover as the cover reel rotates. Simultaneously, the cables or chains are rewound on the cable reels by action of the cable reel motor/transmission assembly. In both procedures of laying down or taking up the cover, downward pressing force can be applied to the cover reel by the hydraulic means to facilitate winding, unwinding, and alignment of the cover on the ground or on the cover reel. However, the weight of the cover reel itself may be sufficient to do this.

In an alternative embodiment, the invention has a first frame which can be attached to a prime mover. A second frame is attached rotatably to the first frame and a third frame is attached rotatably to the second frame. Hydraulic means are connected between the first and second frames to raise and lower the second frame. The second frame contains a cover reel with a ground cover which is wound or unwound by a motor/transmission assembly connected to the first frame. The second frame also contains a brush/guide mechanism. The third frame contains a motor/transmission assembly which winds or unwinds cables from cable reels connected to the third frame. There is a hydraulic means between the first and third frames to raise and lower the third frame. In this embodiment, the cover is laid down by pulling the unit on the ground behind the prime mover. The cover and cables or chains are attached at one end to the ground and unwind freely as the unit is pulled away. The cover is taken up by pulling the unit behind the prime mover. The cables or chains are taken up by activating the motor/transmission assembly. The prime mover is driven at a speed to facilitate taking up or laying down a cover without a backlash. The cover can also be taken up by activating the cover reel motor/transmission assembly after raising the cover reel off the ground. In both procedures of laying down or taking up the cover, downward pressing force can be applied to the cover reel by the hydraulic means to facilitate winding, unwinding, and alignment of the cover on the ground or on the cover reel. The downward pressing force of the present invention makes it possible to lay the cover rapidly and accurately.

One advantage of the present invention is to provide a cover reel assembly that can apply a ground cover to the ground at a rate not less than 200 feet per minute and simultaneously lay down cables or chains on top of the ground cover at the desired location on the ground cover.

Another advantage of the present invention is to provide a cover reel assembly that can take up a ground cover and the cables or chains from the ground at a rate not less than 200 feet per minute.

A further advantage of the present invention is to provide a cover reel assembly that employs a cover reel on the ground and that can apply a downward pressing force on the reel to facilitate winding, unwinding and alignment of the cover on the ground or on the cover reel.

A yet further advantage of the present invention is to provide a cover reel assembly that can rapidly lay down and take up the ground cover, and the cables or chains that lay on the cover, by pushing the cover reel.

Still a further advantage of the present invention is to provide a cover reel assembly that can lay down and take up the ground cover, and the cables or chains that lay on the cover, by pulling the cover reel.

DETAILED DESCRIPTION OF THE PREFERRED EMBODIMENTS

Figure 7:
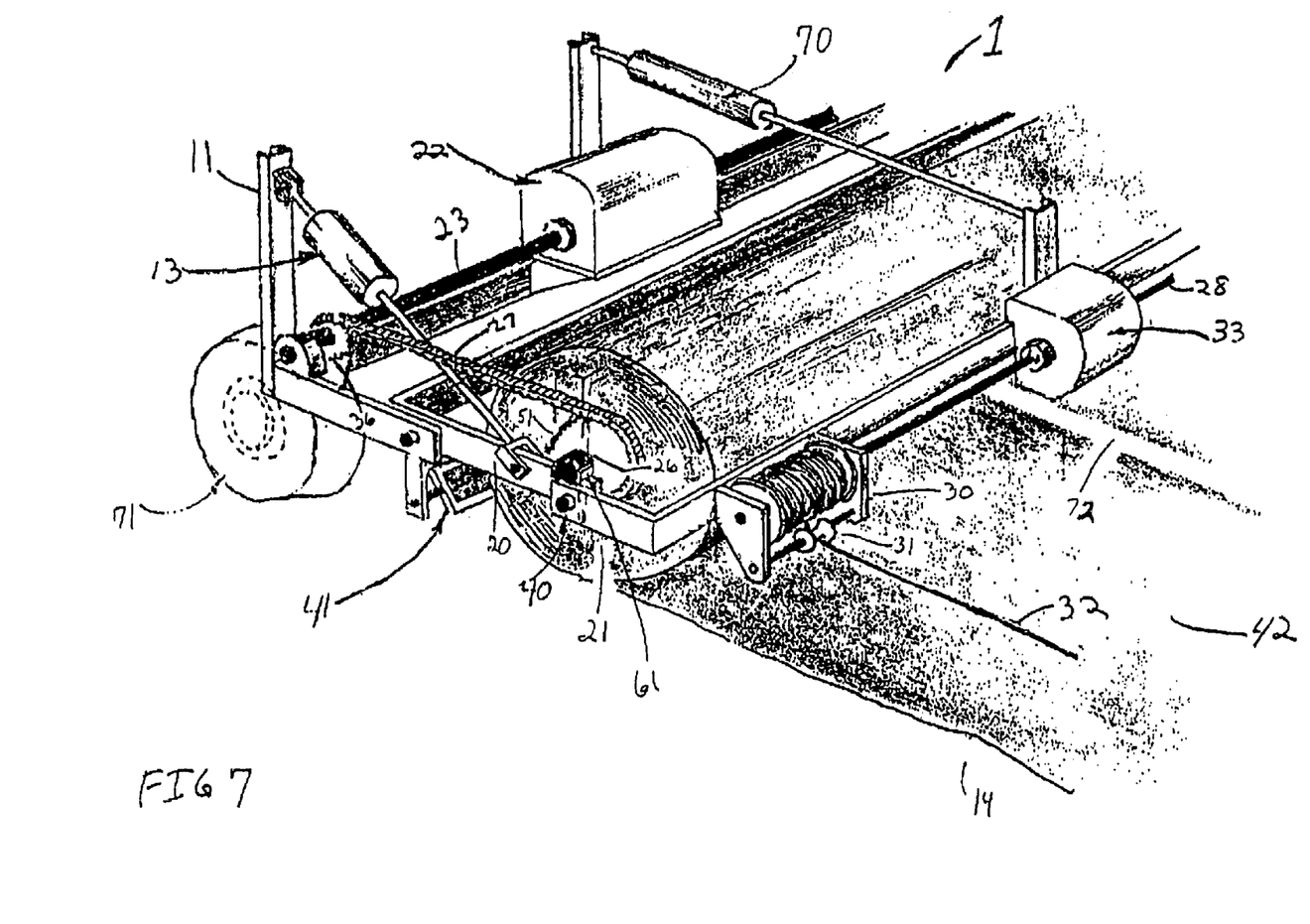
FIG. 7 shows another embodiment of a cover reel apparatus in the lay down position whereby the cover reel apparatus is pulled to lay down the ground cover.
Figure 8:
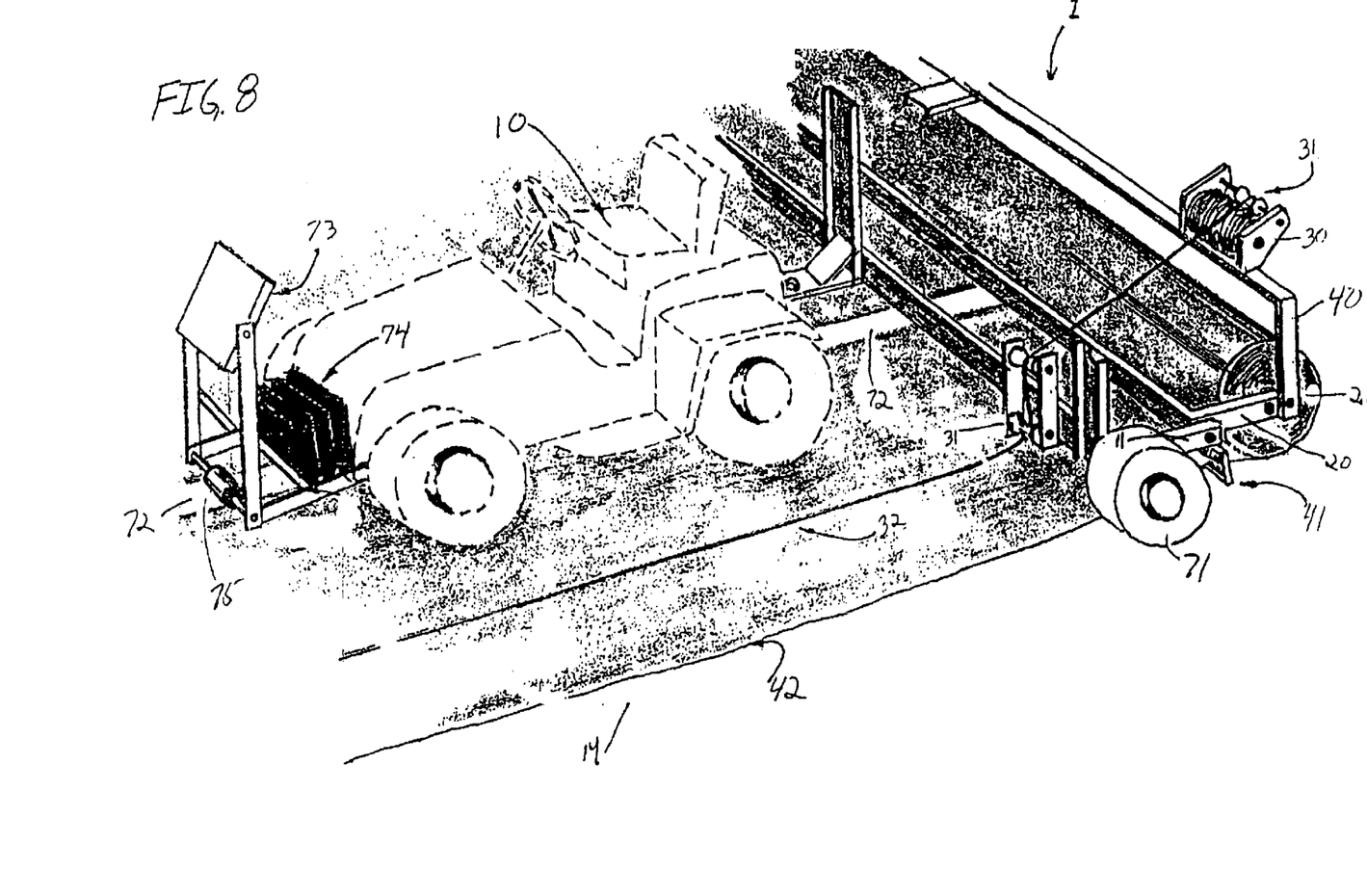
FIG. 8 shows the same embodiment in FIG. 7, but in the take up position whereby the cover reel apparatus is pulled to take up the ground cover.

While the following description details the preferred embodiments of the present invention, it is to be understood that the invention is not limited in its application to the details of construction and arrangement of the parts illustrated in the accompanying drawings, since the invention is capable of other embodiments and of being practiced in various ways. The preferred embodiments of the present invention provide an apparatus for applying and retrieving ground coverings by pushing a cover reel as shown in FIGS. 1–6 or pulling a cover reel as shown in FIGS. 7 and 8.

Figure 1:
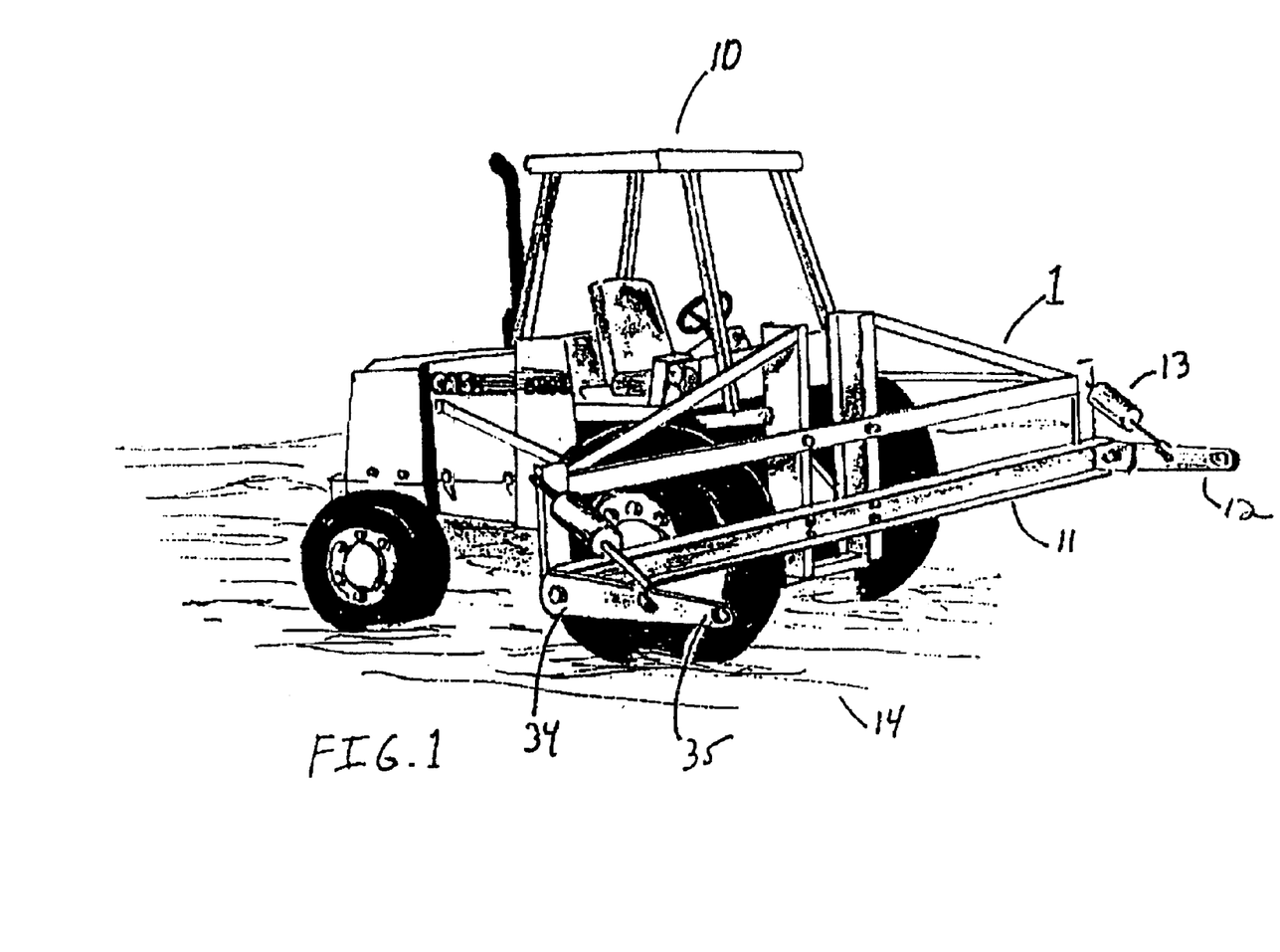
FIG. 1 shows a perspective view of a first frame of the cover reel apparatus attached to a prime mover.

FIG. 1 shows a first frame 11 of the cover reel assembly 1 attached to a prime mover 10 which can push the assembly. First frame 11 has pivotal support arms 12, having a proximal end 34 and a distal end 35. In between frame 11 and pivotal support arm 12 are means 13 for raising and lowering pivotal support arms 12. Preferably, the raising and lowering means are hydraulic means, but may also include pneumatic means and other mechanical means such as various motor and shaft assemblies known in the art.

Figure 2:
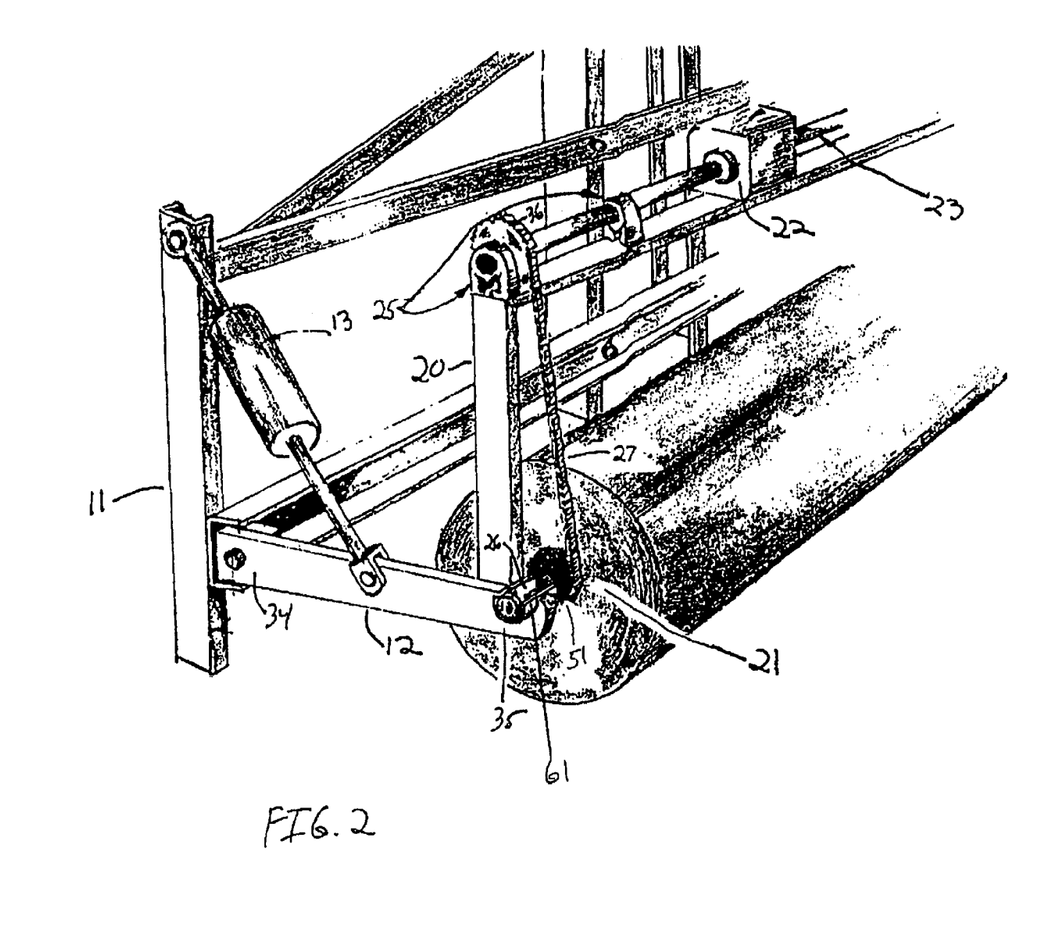
FIG. 2 shows a second frame of the cover reel apparatus attached to the first frame, including the cover reel and hydraulic means to lift the cover reel.
Figure 5A:
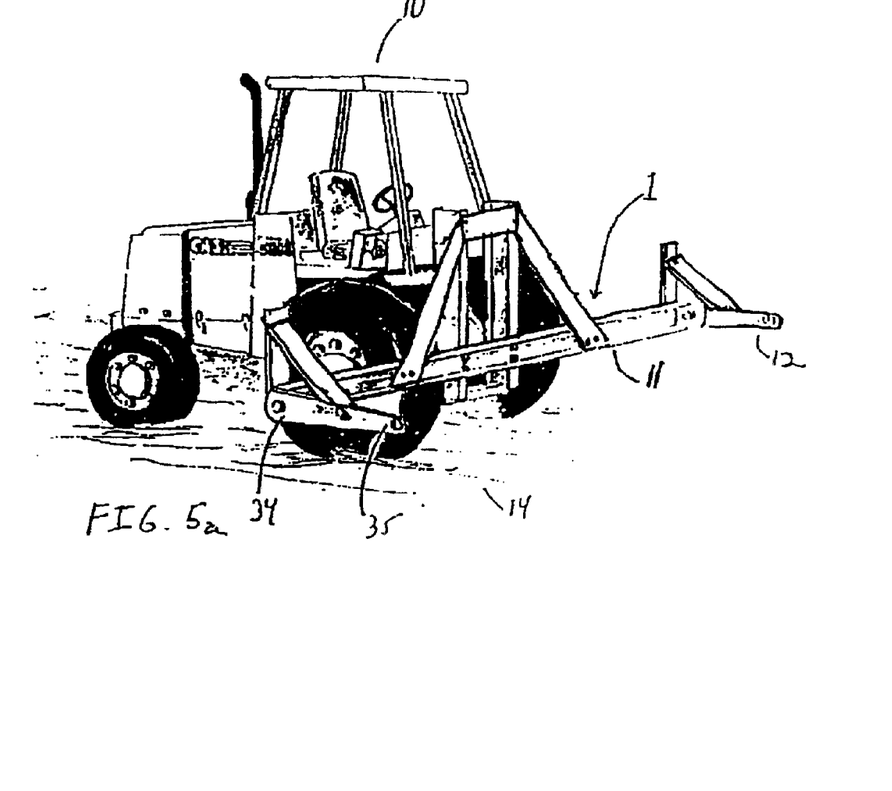
FIGS. 5a and 5b show another embodiment of a cover reel apparatus where the hydraulic means for applying downward pressure on the cover reel are located between the first frame and the prime mover.
Figure 5B:
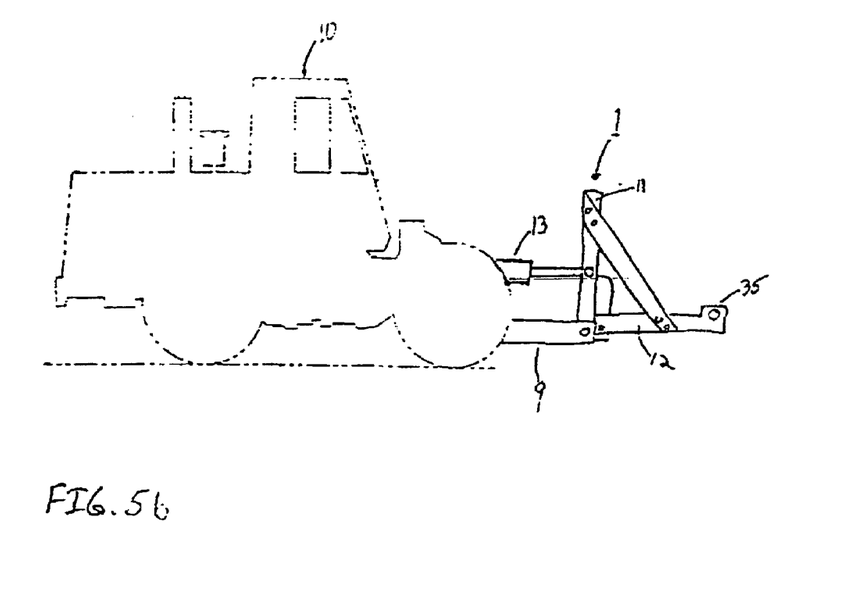

FIG. 2 shows one half of the cover reel assembly 1, since the assembly is symmetrical. Proximal end 34 of pivotal support arm 12 is attached rotatably to first frame 11. At distal end 35 of pivotal support arm 12, a cover reel 21 is rotatably mounted by means of removable cover reel end assembly 26 in bushing assembly 61. Bushing assembly 61 is a split bushing assembly where FIG. 2 shows only a bottom portion. Distal end 35 of pivotal support arm 12 has means for attaching an upper portion of the bushing assembly 61 (not shown) such that roller bearing 52 (shown in FIG. 5) of removable cover reel end assembly 26 is completely removably encased in bushing assembly 61.

A second frame 20 is connected by rigid attachment to pivotal support arm distal end 35. Second frame 20 extends above cover reel 21. When the pivotal arms are raised or lowered by hydraulic means 13, second frame 20 and cover reel 21 are also raised and lowered simultaneously. Cover reel motor and transmission 22 are mounted on second frame 20, with a common shaft 23 extending to either end of the frame and supported by pilar blocks 25. Sprockets 36 are mounted on both ends of shaft 23, and connect to sprockets 51 on removable cover reel end assembly 26 by chains 27 or other driving means. Cover reel motor and transmission 22 have a means for disengaging shaft 23 so that cover reel 21 may rotate freely.

Figure 3:
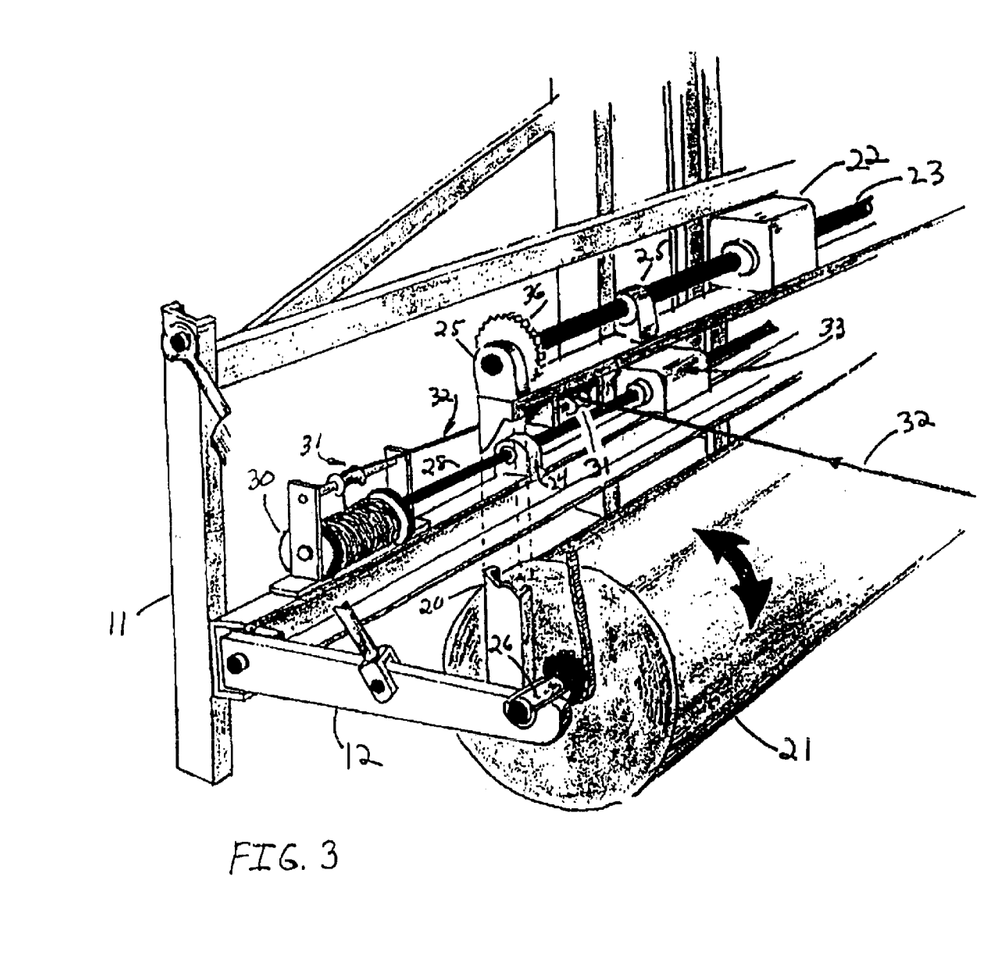
FIG. 3 shows the first and second frames with the cable reel and cables or chains.

FIG. 3 shows additionally cable reels 30 rigidly mounted on either end of frame 11. The cable reels 30 have guide spools 31. The second frame 20 also has guide spools 31. A cable reel motor and transmission 33 is mounted on first frame 11 with a common shaft 28 extending to each cable reel 30 and supported by pilar blocks 24. Cable reel motor and transmission 33 have a means for disengaging shaft 23 so that cable reel 30 may rotate freely.

Figure 4:
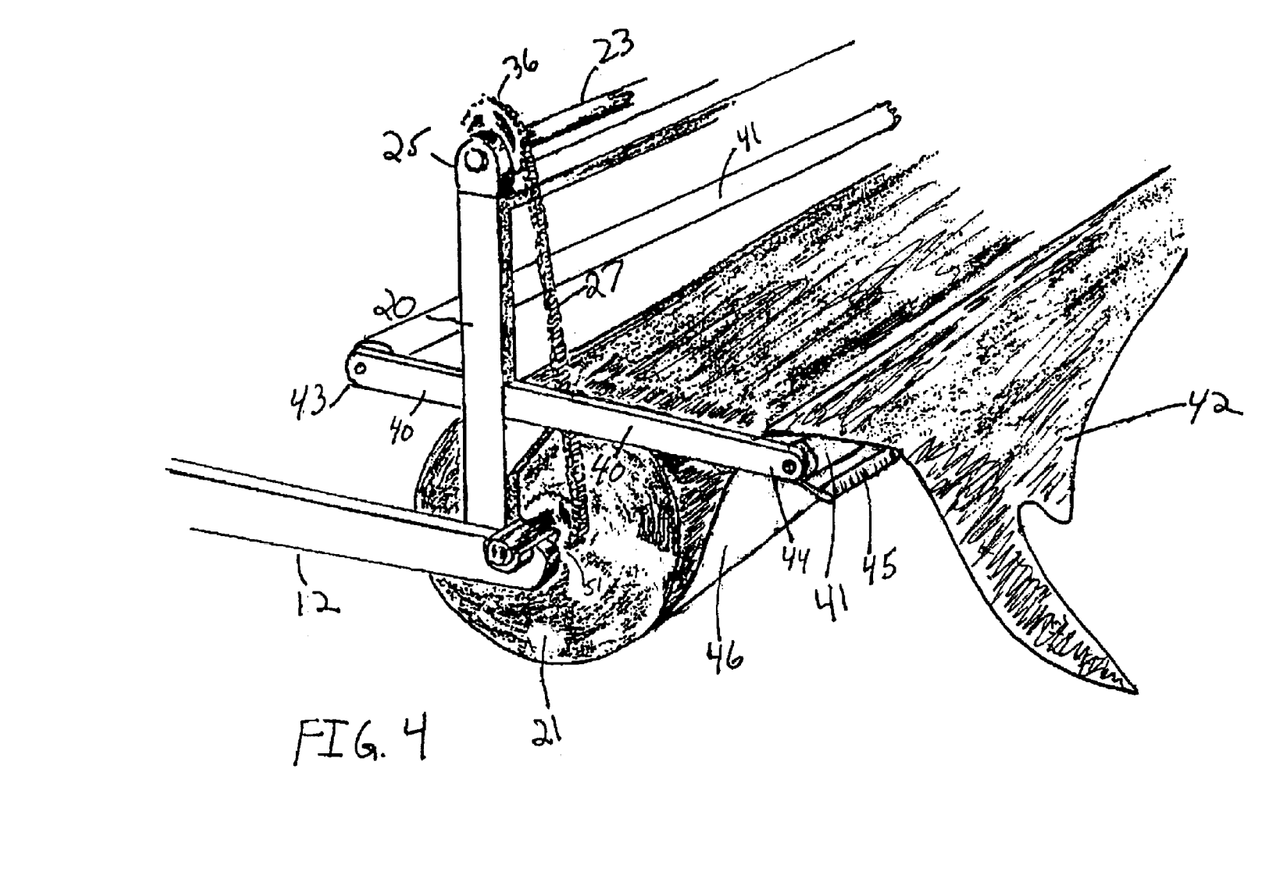
FIG. 4 shows a tension bar arm attached to the second frame with tension bars or rollers in front of the cover reel and in back of the cover reel.

FIG. 4 shows tension bar arms 40 rigidly attached to second frame 20 with tension bar arm ends 43 extending behind cover reel 21 and tension bar arm ends 44 extending in front of cover reel 21. Tension bars or rollers 41 are attached to tension bar arm ends 43 and 44 so that one tension bar 41 is in back of cover reel 21 and another tension bar 41 is in front of cover reel 21. Tension bar arm end 44 has a brush attachment 45 for cleaning the underside 46 of ground cover 42 as cover 42 is rewound from the ground onto cover reel 21. Cover 42 can be placed over brush mechanism 45 and tension bar 41 in front of cover reel 21 during rewinding and uptake of cover 42.

FIGS. 5a and 5b show another embodiment of the present invention. In this simplified version, frame 11 of cover reel assembly 1 is attached rotatably to prime mover 10, for example, by brace extensions 9, or any other suitable attachment mechanism. Raising and lowering means 13, preferably hydraulic means, are positioned between prime mover 10 and cover reel assembly 1. Hydraulic means 13 are rotatably attached to frame 11 and pivotal support arms 12 are attached fixedly to frame 11 so that when hydraulic means 13 are extended, frame 11 rotates forward and downward, lowering cover reel 21 to the ground and, if desired, applying a downward pressure on cover reel 21. When hydraulic means 13 are retracted frame 11 rotates backward and upward, raising cover reel 21 off the ground for maneuverability.

Figure 6A:
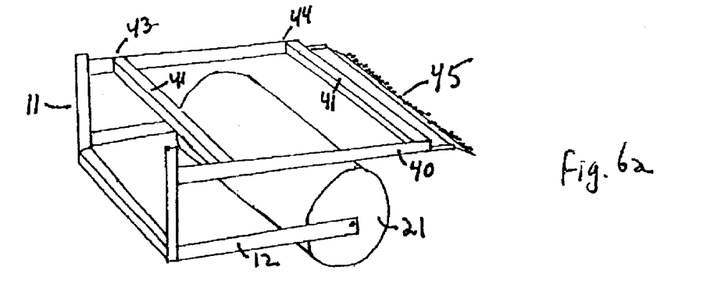
FIGS. 6a, 6b, 6c, and 6d show embodiments of the methods of laying down and taking up a ground cover and cables or chains, whereby laying down or taking up of the ground cover is produced by pushing the cover reel on the ground.
Figure 6B:
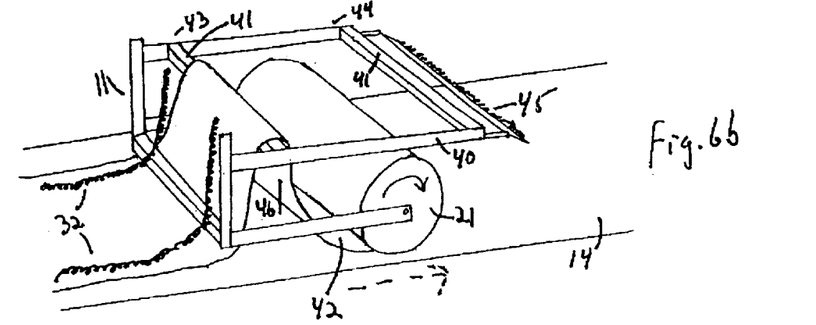

FIGS. 6a, 6b, 6c, and 6d show how the embodiments of the present invention described in FIGS. 1–5 can be used to lay down and take up a cover 42 on a road surface 14, using the embodiment shown in FIGS. 5a and 5b as an example. FIG. 6a shows frame 11 of the embodiment shown in FIGS. 5a and 5b, having, as an additional feature, a tension bar or roller 41 in front of cover reel 21 at end 44 on tension bar arm 40 and in back of cover reel 21 at end 43 on tension bar arm 40. Tension bar arm 40 at end 44 has a brush mechanism 45. In FIG. 6b, cover 42 and cables or chains 32 are attached to the ground with cables 32 on top of cover 42. Cover 42 is looped over tension bar 41 at tension bar arm end 43 and looped under frame 11. Cover reel 21 is lowered to road surface 14 by hydraulic means 13 by rotating frame 11 forward and downward. The prime mover 10 pushes the cover reel 21 forward, shown by the dashed arrow, unwinding cover 42 freely, shown by the solid arrow, and laying it onto road surface 14. Downward pressure on the cover reel facilitates a rapid, even, uniform, and aligned laying-down of the cover on the ground. The weight of the cover reel itself, however, may provide this downward pressing force. Additional downward, pressing force can be applied by the hydraulic means 13 to forcibly press the cover reel 21 onto the road surface 14. Simultaneously, cables or chains 32 are freely unwinding from cable reels 30 (see FIG. 3) from behind frame 11. As the cables or chains 32 unwind they lay on the surface of cover 42 and serve to hold cover 42 in a secured fixed retained position on road surface 14. Any suitable cable can be used, including chains. Preferably, the cables or chains are laid on the cover 6 inches to 18 inches from each edge of the cover to prevent wind from blowing the cover off the ground.

Figure 6C:
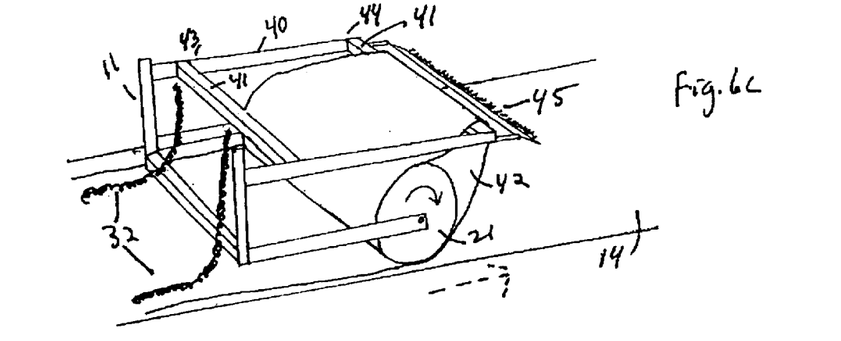

FIG. 6c shows an alternate embodiment for laying down cover 42. Cover 42 is looped over tension bar 41 at end 44 on tension bar arm 40 in front of cover reel 21. Cover 42 is then placed under cover reel 21. As prime mover 10 pushes frame 11 forward cover reel 21 presses down on cover 42 as cover 42 is laid down. Cover 42 may also be looped over brush mechanism 45. The cables or chains 32 are laid onto the surface of cover 42 as described above.

Figure 6D:
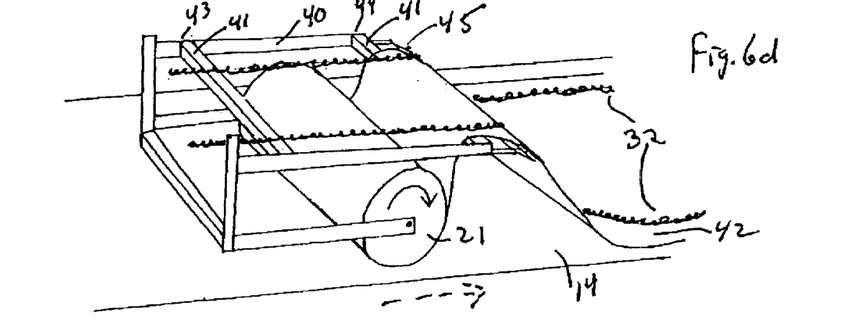

FIG. 6d shows how cover 42 is taken up and rewound on cover reel 21. A free end of cover 42 is looped over brush mechanism 45 and over tension bar 41 at tension bar arm end 44, and then attached to cover reel 21. Cables or chains 32 are attached to cable reels 30. The prime mover 10 pushes cover reel 21 forward, shown by the dashed arrow, thereby winding cover 42 onto cover reel 21, shown by the solid arrow. Additional downward, pressing force can be applied by the hydraulic means 13 to forcibly press the cover reel 21 onto the road surface 14. Simultaneously, cable reel motor and transmission 33 are activated to turn shaft 28 and cable reels 30 thereby winding cables 32 onto cable reels 30 (See FIG. 3). Brush mechanism 45 removes debris from the underside 46 of cover 42 as cover 42 is being taken up by cover reel 21. Cover 42 may also be looped over just tension bar 41 and not over brush mechanism 45.

FIG. 7 shows yet another embodiment of the present invention whereby the cover reel assembly 1 is pulled by the prime mover 10 to lay down the ground cover 42, facilitated by ground support wheels 71. The first frame 11 is connected to a prime mover 10. The first frame 11 has a cover reel motor and transmission 22 with a common shaft 23 extending to either end of first frame 11. Sprockets 36 are mounted on both ends of shaft 23, and connect to sprockets 51 on removable cover reel end assembly 26 by chains 27 or other driving means. Cover reel motor and transmission 22 have a means for disengaging shaft 23 so that cover reel 21 may rotate freely. First frame 11 has a second frame 20 mounted rotatably to first frame 11. In between first frame 11 and second frame 20 are hydraulic means 13 to raise and lower second frame 20. Cover reel 21 is mounted rotatably to second frame 20 by means of removable cover reel end assembly 26 seated removably in bushing assembly 61. Second frame 20 also has a brush/guide mechanism 41 mounted rotatably to second frame 20. Alternatively, second frame 20 may have tension arms 41 in front of cover reel 21 and in back of cover reel 21 similar to those described in FIGS. 4, and 6a, b, c. Also tension arm 41 in front of cover reel 21 may have a brush mechanism 45 similar to that shown in FIGS. 4 and 6a, b, c.

A third frame 40 is mounted rotatably to second frame 20 and has cable reels 30 with cables or chains 32 and guide spools 31. Third frame 40 also has a cable reel motor and transmission 33 with a common shaft 28 extending to each cable reel 30. Cable reel motor and transmission 33 have a means for disengaging shaft 28 so that cable reels 30 may rotate freely. A hydraulic means 70 is located between first frame 11 and third frame 40 to raise and lower third frame 40. To lay down ground cover 42 cover reel 21 is laid on the ground by hydraulic means 13. Additional downward force can be applied by hydraulic means 13 to forcibly press cover reel 21 onto the road surface 14. Cover 42 may also be first looped over a tension bar as shown in FIG. 6b. Prime mover 10 pulls the cover reel 42 forward, unwinding cover 42 freely and laying it onto road surface 14. Additional downward force by hydraulic means 13 facilitates and ensures an even, uniform and aligned laying down of cover 42 on road surface 14. Simultaneously, cables or chains 32 are freely unwinding from cable reels 30 from third frame 40. As the cables or chains 32 unwind they lay on the surface of cover 42 and serve to hold cover 42 in a secured fixed retained position on road surface 14.

FIG. 8 shows the cover reel assembly of FIG. 7 in the take up position. One end of cover reel 42 is passed through brush guide mechanism 41 and attached to cover reel 21. Alternatively, cover 42 may be looped over a tension bar as shown in FIG. 6c. Cables or chains 32 are passed through guide spools 31 on first frame 11 and on cable reel 30 and attached to cable reel 30. Prime mover 10 is on the surface of ground cover 42 and pulls cover reel assembly 1 towards the free end of cover 42 in order to rewind cover 42 on cover reel 21. In order to facilitate alignment of rewinding cover 42 on cover reel 21, cover reel 21 is placed on the ground and a downward pressing force is applied to cover reel 21 by hydraulic means 13. In addition, prime mover 10 may have a mirror assembly 73 which visualizes a yellow center line 72 on the surface of cover 42 and a roller guide 75 which can be made to follow yellow center line 72 to ensure proper alignment of cover 42 on cover reel 21 during take up. Simultaneously, third frame 40 is elevated by hydraulic means 70 above cover reel 21, and cable reel motor and transmission 33 are activated to wind up cables or chains 32 on cable reel 30.

Alternatively, cover reel 21 may be elevated above ground 14 and activated by cover reel motor and transmission 33 to take up cover 42, as prime mover 10 pulls cover reel assembly 1 towards the free end of cover 42.

Figures 9A, 9B, 9C:
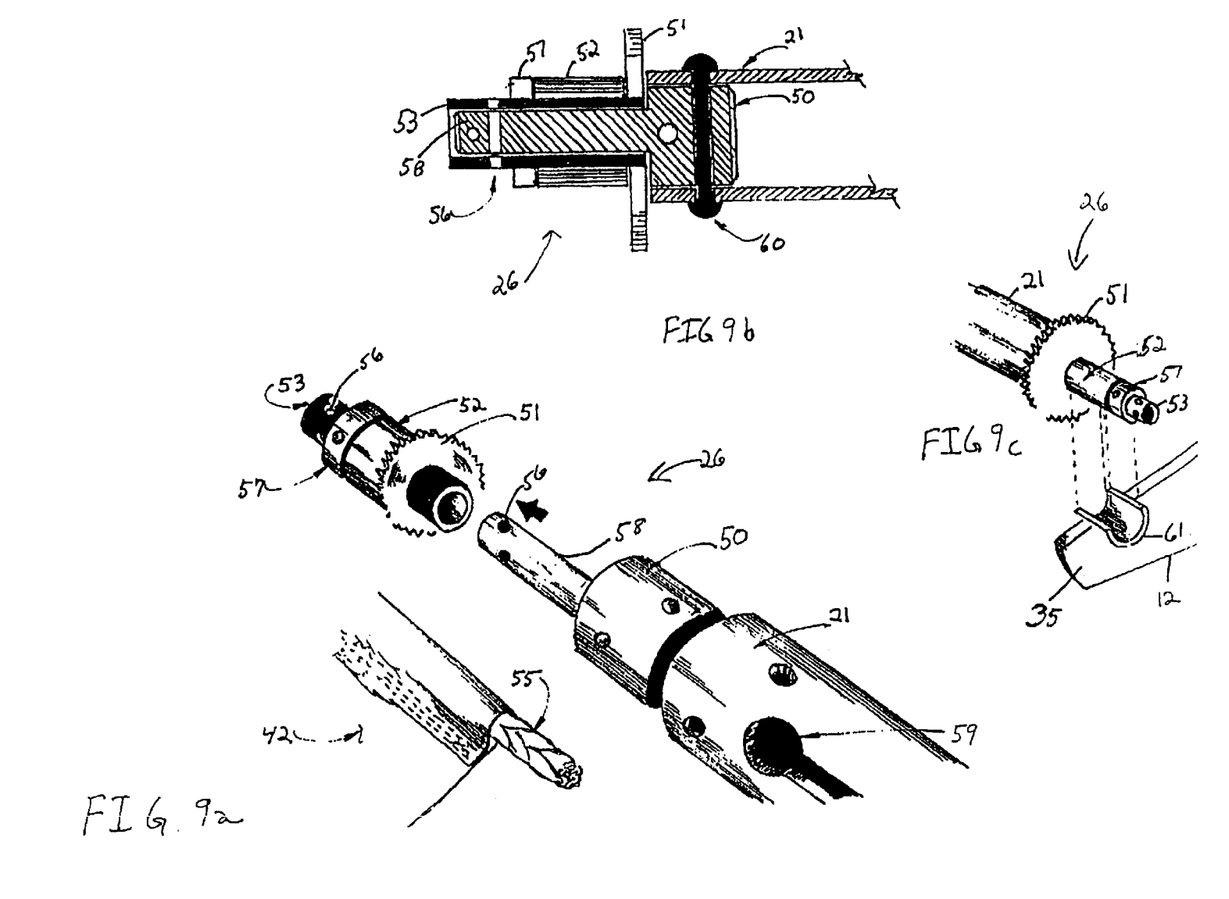
FIGS. 9a, 9b, and 9c show various aspects of a removable cover reel end assembly.

FIG. 9a shows a disassembled view of removable cover reel end assembly 26. Reel end insert 50 fits into cover reel 21. Attached to reel end insert 50 is an end assembly tube insert 58 which extends away from cover reel 21 when reel end insert 50 is inserted into cover reel 21. Reel end insert 50 can be fixed permanently or removably in cover reel 21 by pin 60 which is driven through cover reel 21 and reel end insert 50. End tube assembly 53 removably fits over end assembly tube insert 58 and can be removably fixed by inserting pin through a hole 56 that traverses both end tube assembly 53 and end assembly tube insert 58. End tube assembly 53 has a sprocket 51 and roller bearing 52 with collar 57 rigidly attached. Cover 42 may be inserted into cover reel 21 through cover insert slot 59 using a flexible insert 55 attached to cover 42. FIG. 9b shows the components of removable cover reel end assembly 26 assembled. FIG. 9c shows how roller bearing 52 sits in the bottom portion of bushing assembly 61 at the distal end 35 of pivotal support arm 12. Not shown are attachment means for an upper portion of busing 61 which when joined with bottom portion of bushing 61 will completely reversibly encase roller bearing 52. In this manner, cover reel 21 can rotate freely by means of its connections to reel end insert 50.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, belts and pulleys, or gears and drive shafts, may be used instead of chains and sprockets to wind or unwind the cover reel. The cover may be made of different kinds of materials including cloth or plastic. The cover reel assembly may be used to lay down materials other than covers such as barriers or mesh. Various combinations of pushing or pulling in conjunction with activation of the cover reel motor and transmission may be used. Various components of the cover reel assembly may be made of a variety of materials including metals and plastic. The first frame can be constructed in foldable sections in order to meet legal requirements for maximum width for highway transport.

It will be understood that various changes in the details, materials, and arrangements of the parts which have been described and illustrated above in order to explain the nature of this invention may be made by those skilled in the art without departing from the principle and scope of the invention as recited in the following claims.

I claim:

1. An apparatus for laying down or retrieving a ground cover, comprising:
   a) a first frame removably and rotatably attached to a prime mover;
   b) support arms attached to said first frame;
   c) a cover reel attached rotatably to said support arms for laying down or retrieving said ground cover and wherein said means for rotating provides a downward pressing force to press said cover reel onto the ground; and
   d) means for rotating said first frame downward or upward to lower and raise said cover reel, said means attached to said first frame between the prime mover and said first frame.

2. The apparatus of claim 1, further comprising cable reels with cables, said cable reels having a motor, a transmission, and a shaft for disengageably driving said cable reels, to unwind said cables on top of said ground cover and to rewind said cables onto said cable reels.

3. The apparatus of claim 2, wherein said cable is a chain.

4. The apparatus of claim 1, further comprising tension bar arms on said first frame providing a tension bar in front of said cover reel and a tension bar in back of said cover reel.

5. The apparatus of claim 4 wherein said tension bar in front of said cover reel has a brush mechanism.

6. The apparatus of claim 1, further comprising a second frame attached to said support arms, said second frame having a motor, a transmission, and a shaft for disengageably driving said cover reel to retrieve said ground cover.

7. The apparatus of claim 6, further comprising cable reels with cables, said cable reels having a motor, a transmission, and a shaft for disengageably driving said cable reels, to unwind said cables on top of said ground cover and to rewind said cables onto said cable reels.

8. The apparatus of claim 7 wherein said cable is a chain.

9. The apparatus of claim 7, further comprising tension bar arms on said first frame providing a tension bar in front of said cover reel and a tension bar in back of said cover reel.

10. The apparatus of claim 9 wherein said tension bar in front of said cover reel has a brush mechanism.

11. The apparatus of claim 6, wherein said cover reel has ends for attaching removable mechanisms, said mechanisms having drive sprockets and roller bearings, said roller bearings contained within bushings in said support arms to allow the cover reel to rotate, and wherein said shaft on the second frame has end sprockets which connect to said drive sprockets to drive said cover reel to retrieve the ground cover.

12. The apparatus of claim 11, wherein said end sprockets are connected to said drive sprockets by a chain.

13. The apparatus of claim 1, wherein said cover reel has a cover insert slot and said cover has a flexible insert, for attaching the cover to the cover reel.

14. The apparatus of claim 1, wherein means for rotating said first frame are hydraulic.

15. The apparatus of claim 1, wherein means for rotating said first frame are pneumatic.

16. The apparatus of claim 1, wherein means for rotating said first frame are a motor and shaft assembly.

17. An apparatus for laying down or retrieving a ground cover, comprising:
   a) a first frame removably and rotatably attached to a prime mover;
   b) support arms attached to said first frame;
   c) a cover reel attached rotatably to said support arms for laying down or retrieving said ground cover and wherein said means for rotating lowers said cover reel whereby the weight of said cover reel provides a downward pressing force onto the ground; and
   d) means for rotating said first frame downward or upward to lower and raise said cover reel, said means attached to said first frame between the prime mover and said first frame.

18. An apparatus for laying down or retrieving a ground cover, comprising:
   a) a first frame removably and rotatably attached to a prime mover;
   b) support arms attached to said first frame;
   c) a cover reel attached rotatably to said support arms for laying down or retrieving said ground cover;
   d) means for lowering and raising said cover reel, said means attached to said first frame between the prime mover and said first frame; and
   e) tension bar arms attached to said first frame providing a tension bar in front of said cover reel and a tension bar in back of said cover reel.

19. The apparatus of claim 18, further comprising cable reels with cables, said cable reels having a motor, a transmission, and a shaft for disengageably driving said cable reels, to unwind said cables on top of said ground cover and to rewind said cables onto said cable reels.

20. The apparatus of claim 19, wherein said cable is a chain.

21. The apparatus of claim 18 wherein said tension bar in front of said cover reel has a brush mechanism.

22. The apparatus of claim 18, further comprising a second frame attached to said support arms, said second frame having a motor, a transmission, and a shaft for disengageably driving said cover reel to retrieve said ground cover.

23. The apparatus of claim 18 wherein said means for lowering and raising said cover reel rotates said first frame downward or upward to lower and raise said cover reel.

24. An apparatus for laying or retrieving a ground cover comprising:

a) a first frame removably attached to a prime mover;
b) pivotal support arms having first ends and second ends, said first ends attached rotatably to said first frame, and a cover reel attached rotatably to said second ends;
c) means for raising and lowering said pivotal support arms attached between said first frame and said pivotal support arms wherein said raising and lowering means raise and lower said cover reel; and
d) a second frame attached to said second ends of the pivotal support arms, said second frame having a motor, a transmission, and a shaft for disengageably driving said cover reel to retrieve said ground cover.

25. The apparatus of claim 24, further comprising cable reels with cables, said cable reels having a motor, a transmission, and a shaft for disengageably driving said cable reels to unwind said cables on top of said ground cover and to rewind said cables onto said cable reels.

26. The apparatus of claim 25, wherein said cable is a chain.

27. The apparatus of claim 24 further comprising tension bar arms on said first frame providing a tension bar in front of said cover reel and a tension bar in back of said cover reel.

28. The apparatus of claim 27 wherein said tension bar in front of said cover reel has a brush mechanisms.

29. An apparatus for laying or retrieving a ground cover, comprising:
a) a first frame removably attached to a prime mover;
b) a second frame rotatable attached to the first frame, said second frame having a cover reel mounted rotatable thereon;
c) hydraulic means connected between the first frame and the second frame to raise and lower said second frame; and
d) a third frame attached rotatably to said second frame, said third frame having cable reels with cables, said cable reels having a motor, transmission, and a shaft for disengageably driving said cable reels to unwind said cables on top of said ground cover and to rewind said cables onto said cable reels.

30. The apparatus of claim 29 wherein said first frame has a motor, transmission, and shaft for disengageably driving said cover reel to retrieve said ground cover.

31. The apparatus of claim 29, further comprising hydraulic means connected between said first frame and said third frame to facilitate the laying down or retrieval of said cables.

32. The apparatus of claim 29, wherein said cable is a chain.

33. The apparatus of claim 29, wherein said ground cover has a median line and said prime mover has a mirror and roller to visualize the roller on the median line to align the retrieval of the ground cover onto the cover reel.

34. The apparatus of claim 29 further comprising a tension bar on said second frame behind said cover reel and a tension bar on said second frame in front of said cover reel.

35. The apparatus of claim 34 wherein said tension bar in front of said cover reel has a brush mechanism.

36. A method for rapidly laying down or retrieving a ground cover, comprising:
a) providing a cover reel assembly removably attached to a prime mover, said cover reel assembly having a cover reel with a ground cover;
b) lowering said cover reel to the ground using raising and lowering means attached to said cover reel assembly;
c) pushing the cover reel assembly with the prime mover so as to freely unwind said ground cover onto the ground; and
d) retrieving said ground cover by attaching said ground cover to said cover reel, and winding said ground cover onto said cover reel by pushing said cover reel assembly with the prime mover.

37. The method of claim 36, further comprising providing cable reels with cables which freely unwind simultaneously as the prime mover pushes the cover reel assembly, laying said cables onto the ground cover to hold said ground cover on the ground.

38. The method of claim 37, wherein said cables are retrieved simultaneously while retrieving said ground cover by attaching said cables to the cable reels and winding the cables onto the cable reels by activating a motor, transmission, and a shaft.

39. The method of claim 38 wherein said cables are chains.

40. The method of claim 36 further comprising providing tension bars in front of and behind said cover reel and looping said cover over said tension bar in back of said cover reel when laying down said cover, and looping said cover over said tension bar in front of said cover reel when retrieving said cover.

41. The method of claim 36, wherein retrieving said ground cover is accomplished by elevating said cover reel with said raising and lowering means, attaching said ground cover to said cover reel, and winding said ground cover onto said cover reel by activating a motor, transmission, and a shaft on said cover reel assembly.

42. A method for rapidly applying laying down or retrieving a ground cover, comprising:
a) providing a cover reel assembly removably attached to a prime mover, said cover reel assembly having a cover reel with a ground cover;
b) lowering said cover reel to the ground using raising and lowering means attached to said cover reel assembly;
c) pulling the cover reel assembly with the prime mover so as to freely unwind said ground cover onto the ground;
d) retrieving said ground cover by attaching said ground cover to said cover reel, and winding said ground cover onto said cover reel by pulling said cover reel assembly with the prime mover; and
e) providing cable reels with cables which freely unwind simultaneously as the prime mover pushes the cover reel assembly, laying said cables onto the ground cover to hold said ground cover on the ground.

43. The method of claim 42, wherein said cables are chains.

44. The method of claim 42, wherein said cables are retrieved simultaneously with retrieving said ground cover by attaching said cables to the cable reels and winding the cables onto the cable reels by activating a motor, a transmission, and a shaft.

45. The method of claim 42, wherein said ground cover has a median line and said prime mover has a mirror and roller to visualize the roller on the median line to align the retrieval of the ground cover onto the cover reel.

46. The method of claim 42, wherein retrieving said ground cover is accomplished by elevating said cover reel with said raising and lowering means, attaching said ground cover to said cover reel, and winding said ground cover onto said cover reel by activating a motor, transmission, and a shaft on said cover reel assembly.

* * * * *